US012665532B2

(12) United States Patent
Tsoumas et al.

(10) Patent No.: US 12,665,532 B2
(45) Date of Patent: Jun. 23, 2026

(54) MODEL PREDICTIVE CONTROL FOR ELECTRICAL MACHINES WITH MULTIPLE SETS OF WINDINGS

(71) Applicant: ABB Schweiz AG, Baden (CH)

(72) Inventors: Ioannis Tsoumas, Zurich (CH); Tobias Geyer, Ennetbaden (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/880,733

(22) PCT Filed: Jul. 3, 2023

(86) PCT No.: PCT/EP2023/068261
§ 371 (c)(1),
(2) Date: Jan. 2, 2025

(87) PCT Pub. No.: WO2024/008658
PCT Pub. Date: Jan. 11, 2024

(65) Prior Publication Data
US 2026/0005630 A1      Jan. 1, 2026

(30) Foreign Application Priority Data

Jul. 4, 2022    (EP) ..................................... 22182749

(51) Int. Cl.
*H02P 21/14*        (2016.01)
*H02P 21/05*        (2006.01)
(Continued)

(52) U.S. Cl.
CPC ............ *H02P 21/141* (2013.01); *H02P 21/05* (2013.01); *H02P 21/18* (2016.02); *H02P 21/20* (2016.02);
(Continued)

(58) Field of Classification Search
CPC ........ H02P 21/141; H02P 21/18; H02P 21/20; H02P 21/22; H02P 21/05; H02P 2101/15; H02P 2103/20
See application file for complete search history.

(56) References Cited

U.S. PATENT DOCUMENTS 8,766,570 B2      7/2014  Geyer et al.
10,516,328 B2    12/2019  Spudic et al.
(Continued)

FOREIGN PATENT DOCUMENTS

EP          3736971 A1    11/2020
WO    2017/013125 A1     1/2017
(Continued)

OTHER PUBLICATIONS

Geyer et al., Model Predictive Pulse Pattern Control. IEEE Transactions on Industry Applications. Mar./Apr. 2012;48(2):663-676.
(Continued)

*Primary Examiner* — Viet P Nguyen
(74) *Attorney, Agent, or Firm* — McCarter & English, LLP

(57) ABSTRACT
A method for controlling an electrical converter is disclosed. First, an average flux reference is determined from a reference torque and an estimated torque. At least one difference flux reference is determined from at least one difference current reference. A winding flux reference for each winding system is determined from the average flux reference and the at least one difference flux reference by adding and/or subtracting the at least one difference flux reference to the average flux reference. Switching commands for each converter branch are determined from the winding flux reference and an estimated winding flux for the winding system, which is connected to the respective converter branch. The winding flux reference and the estimated winding flux are provided to a dedicated model predictive controller for the
(Continued)

respective converter branch, which determines the switching commands; and applying the switching commands to each converter branch.

14 Claims, 5 Drawing Sheets

(51) Int. Cl.
| | |
|---|---|
| *H02P 21/18* | (2016.01) |
| *H02P 21/20* | (2016.01) |
| *H02P 21/22* | (2016.01) |
| *H02P 101/15* | (2016.01) |
| *H02P 103/20* | (2016.01) |

(52) U.S. Cl.
CPC .......... *H02P 21/22* (2016.02); *H02P 2101/15* (2015.01); *H02P 2103/20* (2015.01)

(56) References Cited

U.S. PATENT DOCUMENTS

| | | |
|---|---|---|
| 2015/0032423 A1 | 1/2015 | Tang |
| 2022/0200495 A1* | 6/2022 | Freire ..................... H02P 21/05 |

FOREIGN PATENT DOCUMENTS

| | | |
|---|---|---|
| WO | 2019/137916 A1 | 7/2019 |
| WO | 2024/008658 A1 | 1/2024 |

OTHER PUBLICATIONS

Geyer, Model Predictive Control of High Power Converters and Industrial Drives. John Wiley & Sons, Ltd., 576 pages, (2017).

Karttunen et al., Decoupled Vector Control Scheme for Dual Three-Phase Permanent Magnet Synchronous Machines. IEEE Transactions on Industrial Electronics. May 2014;61(5):2185-2196.

Liu et al., Optimized SVM and Remedial Control Strategy for Cascaded Current-Source-Converters-Based Dual Three-Phase PMSM Drives System. IEEE Transactions on Power Electronics. Jun. 2020;35(6):6153-6164.

Reusser et al., Nine switch multi-channel dual converter for WECS. IECON2015—Yokohama. pp. 005363-005368, Nov. 9-12, 2015.

Zhao et al., Space Vector PWM Control of Dual Three-Phase Induction Machine Using Vector Space Decomposition. IEEE Transactions on Industry Applications. Sep./Oct. 1995;31(5):1100-1109.

International Search Report and Written Opinion for Application No. PCT/EP2023/068261, dated Sep. 20, 2023, 14 pages.

* cited by examiner

MODEL PREDICTIVE CONTROL FOR ELECTRICAL MACHINES WITH MULTIPLE SETS OF WINDINGS

CROSS-REFERENCE TO RELATED APPLICATIONS

The present application is a national phase entry of International Patent Application No. PCT/EP2023/068261, filed on Jul. 3, 2023, and titled "MODEL PREDICTIVE CONTROL FOR ELECTRICAL MACHINES WITH MULTIPLE SETS OF WINDINGS", which claims priority to European Patent Application No. 22182749.6, filed on Jul. 4, 2022, and titled "MODEL PREDICTIVE CONTROL FOR ELECTRICAL MACHINES WITH MULTIPLE SETS OF WINDINGS", which are hereby incorporated by reference in their entirety.

TECHNICAL FIELD

The present disclosure relates to the field of high power converter control. In particular, the present disclosure relates to a method, a computer program, a computer-readable medium and a controller for controlling an electrical converter. The present disclosure also relates to the electrical converter.

BACKGROUND

The torque control of electrical machines with multiple sets of three-phase windings is typically achieved via vector current control in a rotating reference frame aligned with the rotor flux. Such a linear control approach focuses on the control of the fundamental current component, and it is suitable for converters modulated via carrier-based pulse width modulation (CB-PWM). By sampling at appropriate time instants with CB-PWM it is straightforward to sample only the current fundamental component without the need of using a low-pass filter.

However, in medium voltage drives, optimized pulse patterns (OPPs) are often employed to minimize the current ripple at the (very low) permissible switching frequency. With an OPP-modulated converter, one cannot distinguish the fundamental current component from the ripple via appropriate sampling. Low-pass filters must be applied to the measured currents instead. The low-pass filtering limits the controller gain and adversely affects the drive dynamic performance. Another implication of the linear controller is that the switching angles of the OPPs must evolve smoothly and without any discontinuities over the modulation index range where they are applied. This is an additional constraint for the OPP calculation, which in most cases results in suboptimal OPPs with a higher current ripple.

The above problems are solved with the employment of model predictive pulse pattern control (MP3C) for torque and flux control in OPP-modulated converters. MP3C controls the instantaneous flux along its reference trajectory, which is defined by the applied OPP of the converter connected to the machine terminals. The reference trajectory includes the ripple and thus no filtering to extract the fundamental component is required. This results in a fast torque control. Furthermore, the switching angles of the applied OPPs are allowed to have some discontinuities over the modulation index.

Nevertheless, the currently employed MP3C has been designed for electrical machines with only one set of three-phase windings and cannot be directly applied to electrical machines with two or more sets of three-phase windings.

EP 2 469 69 2A1 and U.S. Pat. No. 8,766,570 B2 describe a flux-based MP3C method, which uses OPP control to follow a pre-computed stator flux trajectory. EP 15 177 656 A1 describes how a neutral point potential can be included into MP3C.

WO 2019/137916 A1 describes model predictive control based on pulse width modulated switching patterns, which are determined online.

BRIEF DESCRIPTION

It is an objective of the present disclosure to improve the control of an electrical converter with at least two converter branches connected to at least two winding systems of an electrical machine. Further objectives of the present disclosure are to reduce total harmonic distortion and losses of such an electrical converter.

These objectives are achieved by the subject-matter of the independent claims. Further exemplary embodiments are evident from the dependent claims and the following description.

An aspect of the present disclosure relates to a method for controlling an electrical converter. The electrical converter may be a low or medium-voltage converter adapted for processing voltages up to 5 kV or more. The electrical converter comprises at least two converter branches, which at one end are connected in parallel to at least two winding systems of an electrical machine. At the other end, each converter branch may be connected to a winding of at least one transformer. The electrical machine may be a generator, in particular the generator of a wind turbine.

According to an embodiment of the present disclosure, the method comprises: determining an average flux reference, for example in a rotating reference frame, from a reference torque and an estimated torque, which is determined from measured currents and measured and/or reconstructed voltages in the winding systems. For torque control, one average flux reference is considered. An optimal reference amplitude and angle for the average flux reference may be determined for the desired reference torque. The average flux reference may be the average of all flux references of the winding systems. The average flux reference may be provided as an amplitude and an angle. The reference torque may be provided by an outer control loop, which controls the torque of the electrical machine. The estimated torque is determined from three-phase currents, which are measured in the winding systems, and the estimated stator flux. Alternatively, the estimated torque can be determined from three-phase currents, the estimated rotor flux and the estimated machine inductances. The electrical machine may have a number of N winding systems. A winding system may be a three-phase winding.

According to an embodiment of the present disclosure, the method comprises: determining at least one difference flux reference, for example in the rotating reference frame, from at least one difference current reference. The at least one difference current reference may be provided by an outer control loop.

According to an embodiment of the present disclosure, the method comprises: determining at least one difference flux reference from the at least one difference current. In general, there are N−1 difference flux references for control of the difference (circulating) currents between the sets of winding systems. Each of the difference flux references may be provided as an amplitude and an angle.

According to an embodiment of the present disclosure, the method comprises: determining a winding flux reference for each winding system from the average flux reference and the at least one difference flux reference by adding and/or subtracting the at least one difference flux reference to the average flux reference. The winding flux reference for each winding system is determined based on the one average flux reference and N−1 difference flux references. The average and the N−1 difference fluxes are calculated by multiplying the vector of the N winding fluxes with the following matrix:

$$
D = \begin{bmatrix}
1/N & 1/N & 1/N & \cdot & \cdot & \cdot & 1/N \\
1 & -1 & & & & & \\
& 1 & -1 & & & & \\
& & 1 & -1 & & & \\
& & & \cdot & \cdot & & \\
& & & & \cdot & \cdot & \\
& & & & & 1 & -1
\end{bmatrix}
$$

The winding flux references are calculated by multiplying the vector of the average and difference fluxes with the inverse of D. For example, for a machine with 3 winding systems we have the matrices $$
D = \begin{bmatrix} 1/3 & 1/3 & 1/3 \\ 1 & -1 & 0 \\ 0 & 1 & -1 \end{bmatrix} \text{ and } D^{-1} = \begin{bmatrix} 1 & 2/3 & 1/3 \\ 1 & -1/3 & 1/3 \\ 1 & -1/3 & -2/3 \end{bmatrix}.
$$

According to an embodiment of the present disclosure, the method comprises: determining switching commands for each converter branch from the winding flux reference and an estimated winding flux for the winding system, which is connected to the respective converter branch, wherein the estimated winding flux is determined from the measured current and the measured and/or the reconstructed voltages in the winding system, and wherein the winding flux reference and the estimated winding flux are provided to a dedicated model predictive controller for the respective converter branch, which determines the switching commands. Per winding system and/or converter branch a model predictive controller is used, i.e. a controller operating with a model predictive control method.

Such a method relies on a prediction model, a cost function, an optimization stage and a receding horizon policy. More specifically, a sequence of future control inputs is computed over a prediction horizon such that a cost function is minimized by solving an optimization problem. Out of the sequence of control inputs only the first element at the current time step is applied to the controlled system. At the next time step, new measurements and/or estimates are obtained, and a revised sequence of future control inputs is computed over a prediction horizon that is shifted by one time step. This gives rise to the receding horizon policy.

A particular model predictive control method that is based on OPPs is MP3C. In MP3C, the winding flux vector is controlled along a winding flux reference trajectory using fast closed-loop control by modifying the switching instants of the OPP switching transitions within a prediction horizon. The switching transitions may be modified in time, such that the predicted stator flux error, i.e., the difference between the reference stator flux and the estimated stator flux, is minimized at the end of the prediction horizon.

According to an embodiment of the present disclosure, the method comprises: applying the switching commands to each converter branch. Each converter branch comprises power semiconductors which are controlled according to the switching commands. The electrical converter may be a voltage-source converter with at least one DC link capacitor. By manipulating the switch positions of the converter the voltage applied to the terminals of the machine windings is manipulated, which in turn allows one to control the current, flux and torque components of the machine.

With the method, the flux-based MP3C of torque and flux of electrical machines is extended to electrical machines with more than one three-phase winding. To this end, average and difference flux references are computed which are then translated into winding flux references for each winding system.

In the model predictive control of each winding system, the flux reference trajectory can be calculated considering or neglecting the coupling with other three-phase winding systems. In particular, for a winding system with small resistance, as it is the case for medium-voltage electrical machines, the coupling may be neglected. The reference flux trajectory for each winding system may be computed by a simple integration of the converter output voltage.

According to an embodiment of the present disclosure, the switching commands are determined from OPPs, which are loaded from a look-up table. The OPPs may be pre-computed (i.e. before the operation of the converter) and stored in a look-up table with respect to a pulse number and a modulation index. During operation of the converter, the pulse number and the modulation index may be provided by an outer control loop and the respective OPP may be loaded from the look-up table. The OPP comprises switching instants, which encode when and how the converter has to be switched into another switching state.

According to an embodiment of the present disclosure, the switching commands are determined online during operation of the electrical converter. For example the switching commands and in particular a sequence of switching commands may be computed by pulse width modulation, such as carrier based pulse width modulation or space vector modulation. For example, WO 2019/137916 A1, which is incorporated by reference, describes the online computation of switching commands based on pulse width modulation.

According to an embodiment of the present disclosure, switching instants of the switching commands are moved forward and/or backward in time to minimize a flux error, which is the difference between an optimal winding flux trajectory determined from the winding flux reference and the estimated winding flux. With model predictive control, and in particular with MP3C, the switching instants may be modified to minimize the flux error. Switching instants may be modified by modifying their switching angle and/or their switching time.

According to an embodiment of the present disclosure, the switching commands for each converter branch are determined independently from the switching commands of the at least one other converter branch. The controllers performing the model predictive control method for each converter branch may operate independently, i.e. independently from the winding flux references of the other converter branches. The calculation of the optimal winding flux trajectory for each three-phase winding system may consider only the OPP of the specific three-phase winding system.

According to an embodiment of the present disclosure, the average flux reference and the at least one difference flux reference are determined in a rotating reference frame. The rotating reference frame may rotate with the fundamental frequency, such that the references become DC quantities during steady-state operation. The rotating reference frame may be the dqframe with the d-axis aligned to the rotor flux.

According to an embodiment of the present disclosure, the winding flux references are determined in the rotating reference frame and transformed into a stationary reference frame. This may simplify the determination of the winding flux error and the corresponding correction. To be processed by the model predictive control method, the winding flux references may have to be provided in the stationary reference frame.

According to an embodiment of the present disclosure, an angle of the winding flux reference is calculated in the stationary reference frame.

According to an embodiment of the present disclosure, the at least one difference flux reference is determined from the at least one difference current reference by multiplication with an estimated stator winding inductance for each winding system. The estimated stator winding inductance for a winding system may be the self-inductance of the winding system subtracted from the mutual inductance with the other winding systems.

According to an embodiment of the present disclosure, the method further comprises: determining at least one difference current from measured currents in the at least two windings and determining a difference current error by subtracting the difference current from the difference current reference. The difference current error may be low-pass filtered and/or PI controlled and then added to the difference current reference from which afterwards the difference flux reference may be calculated. In such a way, the difference current error may be corrected that may appear due to an incorrect difference flux calculation because of parameter value mismatches.

According to an embodiment of the present disclosure, an amplitude of the average flux reference may be low-pass filtered. This may dampen oscillations and may reduce fluctuations in the winding flux references.

According to an embodiment of the present disclosure, an amplitude of the average flux reference is determined from a look-up table based on the reference torque. The corresponding look-up table may be pre-computed before the operation of the converter.

According to an embodiment of the present disclosure, an amplitude of the average flux reference is limited within predefined limits. The amplitude of the average flux reference may be limited, so that a specified limit is respected before the synthesis of the winding flux reference. In such a way it may be ensured that a maximum possible converter output voltage is not exceeded.

According to an embodiment of the present disclosure, an angle of the average flux reference is determined from a look-up table in dependence on an amplitude of the average flux reference and the reference torque. The corresponding look-up table may be pre-computed before the operation of the converter.

According to an embodiment of the present disclosure, a torque error, which is the difference between the reference torque and the estimated torque, is low-pass filtered and/or PI controlled and afterwards added to the reference torque, before the angle of the average flux reference is determined from a look-up table. In such a way, a torque error that may appear due to parameter value mismatches, i.e. differences between the actual and the considered values of the machine model parameters, may be corrected.

According to an embodiment of the present disclosure, when an amplitude of the winding flux reference of a winding system exceeds a limit, an amplitude of the average flux reference and/or an amplitude of the difference flux reference is limited such that an amplitude of a re-calculated winding flux reference stays below the limit. The limit of the winding flux reference may be a fixed value. The angle of the average flux reference and the difference flux reference may stay the same. A factor k between 0 and 1, such as determined in equation (14) below, may be applied to the amplitude of the average flux reference and/or the difference flux reference.

According to an embodiment of the present disclosure, each converter branch is configured for converting three-phase electrical quantities with a fundamental voltage, current and frequency into three-phase electrical quantities with another fundamental voltage, current and frequency. For example, each converter branch may comprise a rectifier, a DC-link and an inverter. The inverter and optionally the rectifier may be controlled based on the switching commands.

According to an embodiment of the present disclosure, opposite to the electrical machine, each converter branch is connected to a secondary winding of a transformer. The secondary winding and the primary windings may have a common core. The transformer also may have a primary winding, which is wound around the common core. The primary winding may be used to connect the converter system to an electrical grid. One common transformer with multiple sets of secondary windings or several transformers connected in series may be used. The series-connected transformers may each have one set of secondary three-phase windings.

Further aspects of the present disclosure relate to a computer program for controlling an electrical converter, which, when being executed by a processor, is adapted to carry out the steps of the method as described herein, and to a computer-readable medium, in which such a computer program is stored. The winding flux reference determination as well as the model predictive control may be executed as software on one or more processors.

A computer-readable medium may be a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the present disclosure relates to a controller for controlling an electrical converter. The controller is adapted for performing the method as described herein. The controller may comprise one or more processors, in which the method is run as software. It also may be that the method is at least partially or completely implemented in hardware, such as a DSP or FPGA.

A further aspect of the present disclosure relates to an electrical converter, which is controlled such as described herein.

According to an embodiment of the present disclosure, the electrical converter comprises at least two converter branches connected in parallel to at least two winding systems of an electrical machine, and a controller as described herein.

In general, it has to be understood that features of the method as described in the above and in the following may be features of the computer program, the computer-readable medium, the controller and the electrical converter as described in the above and in the following, and vice versa.

These and other aspects of the present disclosure will be apparent from and elucidated with reference to the embodiments described hereinafter.

BRIEF DESCRIPTION OF DRAWINGS

The subject-matter of the present disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
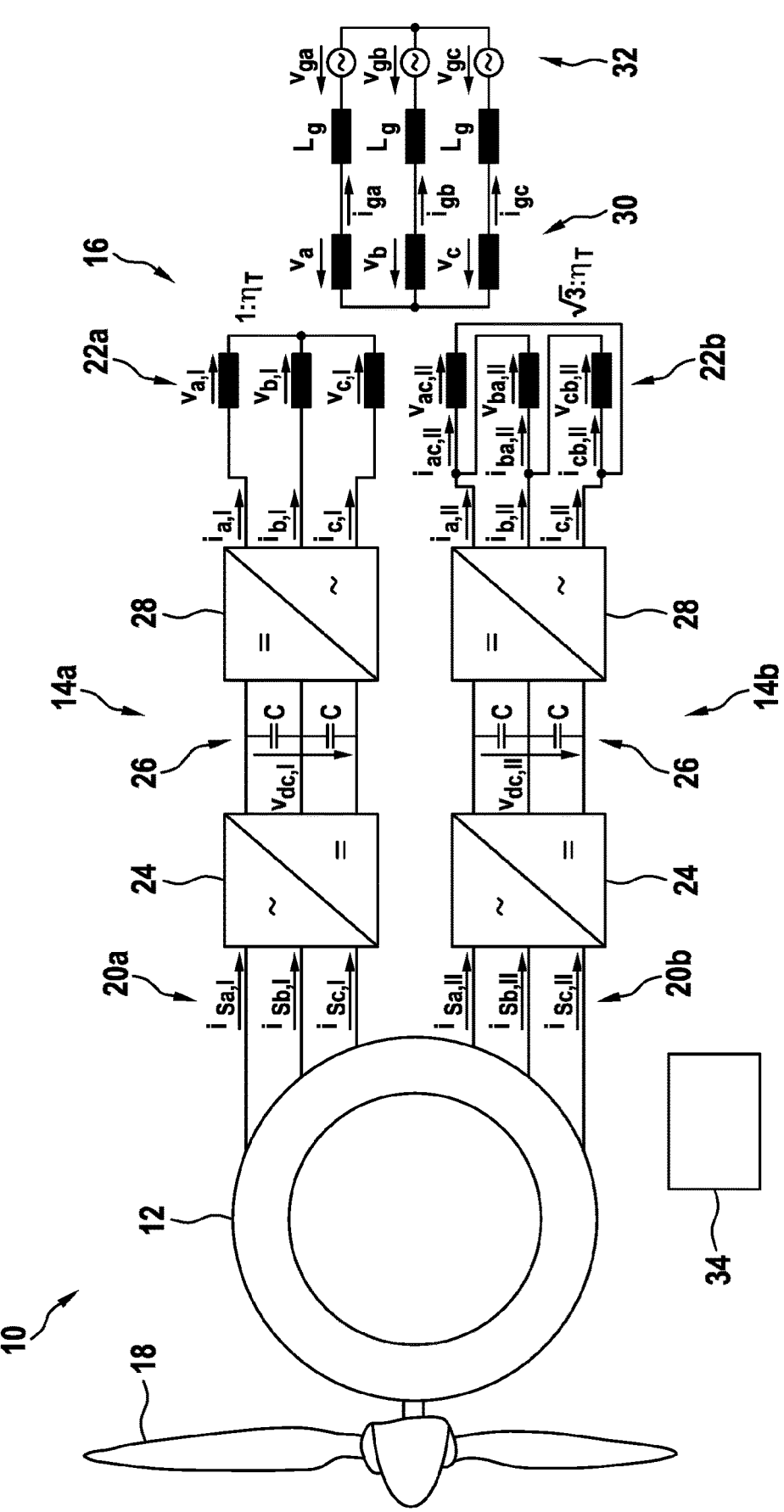
FIG. 1 schematically shows a converter system according to an embodiment of the present disclosure.

FIG. 1 schematically shows a converter system 10, which may be a wind energy conversion system, e.g. a gearless wind energy conversion system. The converter system 10 comprises a rotating electrical machine 12, at least two converter branches 14a, 14b and a transformer 16. The at least two converter branches 14a, 14b form an electrical converter 14. With two converter branches 14a, 14b, the converter system 10 may be seen as a double conversion line system.

The rotating electrical machine 12 may be a generator, e.g. a synchronous generator, or a motor. In the following it is assumed that the rotating electrical machine 12 is a synchronous generator without loss of generality. The rotating electrical machine 12 may be connected with a wind turbine 18.

Figure 2:
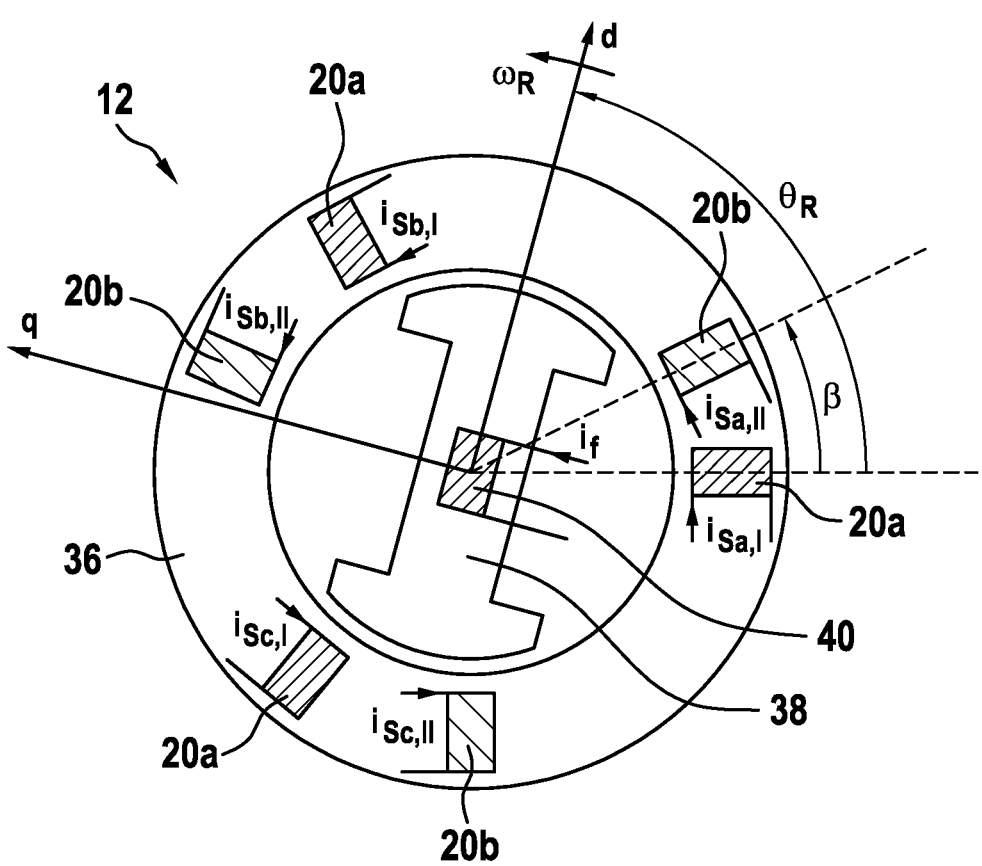
FIG. 2 schematically shows an electrical machine with two sets of three-phase windings.

The rotating electrical machine 12 may have two or more independent winding systems 20 (see FIG. 2). Each of the winding systems 20a, 20b is connected with one of the converter branches 14a, 14b. The first winding system 20a is connected with the first converter branch 14a and generates a three-phase stator current $i_{Sabc,I}$, with components $i_{Sa,I}$, $i_{Sb,I}$, $i_{Sc,I}$, which are supplied to the first converter branch 14a. The first converter branch 14a converts the stator current $i_{Sabc,I}$ into an output current $i_{abc,I}$, with components $i_{a,1}$, $i_{b,I}$, $i_{c,I}$. The output current $i_{Sabc,I}$ is supplied to a secondary winding 22a of the transformer 16. The secondary winding 22a may be star-connected.

Analogously, the second winding system 20b is connected with the second converter branch 14b and generates a three-phase stator current $i_{Sabc,II}$, with components $i_{Sa,II}$, $i_{Sb,II}$, $i_{Sc,II}$, which are supplied to the second converter branch 14b. The second converter branch 14b converts the stator current $i_{Sabc,II}$ into an output current $i_{abc,II}$, with components $i_{a,II}$, $i_{b,II}$, $i_{c,II}$. The output current $i_{abc,II}$ is supplied to a secondary winding 22b of the transformer 16. The secondary winding 22b may be delta-connected.

Each converter branch 14a, 14b may be composed of a rectifier 24, a DC-link 26 and an inverter 28. Both the rectifier 24 and the inverter 28 may be two-level or, as depicted here, three-level converters or they may have even more voltage levels. The rectifier 24 and the inverter 28 may be back-to-back converters and/or 3LNPC (Three-Level Neutral Point Clamped) converters. The machine-side rectifier 24 converts the AC voltage of the respective winding system 20a, 20b into a DC voltage $v_{dc,I}$ or $v_{dc,II}$ supplied to the DC-link 26 and to the grid-side inverter 28. The inverter 28 converts the DC voltage $v_{dc,I}$ or $v_{dc,II}$ into an AC output voltage with the corresponding three-phase output current with components $i_{a,I}$, $i_{b,I}$, $i_{c,I}$ or $i_{a,II}$, $i_{b,II}$, $i_{c,II}$, respectively.

The transformer 16 further comprises a primary winding 30, which is connected to an electrical grid 32. The transformer 16 may be a wye/delta-wye transformer.

The electrical converter 14 and the at least two converter branches 14a, 14b are controlled by a controller 34. The controller 34 may comprise a processor and a computer-readable medium. The computer-readable medium may store a computer program for performing the control method as described herein. Alternatively or additionally, the controller 34 may comprise a circuitry, e.g. an FPGA, ASIC and/or DSP, which is configured for performing the control method. The controller 34 may be configured for modulating and/or switching the rectifiers 24 and the inverters 28. In particular, the rectifiers 24 and/or the inverters 28 may be switched with OPPs. The method as described below may be applied to the rectifiers 24, which are inverters if we have a motor instead of a generator.

FIG. 2 shows the electrical machine 12 in more detail, which comprises a stator 36 and a rotor 38. The stator comprises at least two stator winding systems 20a, 20b, which are geometrically displaced with respect to each other by a fixed angle β. Each stator winding system 20a, 20b has three-phase windings with the stator currents $i_{Sabc,I}$ and $i_{Sabc,II}$. The rotor 38 at moving position $\theta_R$ rotates with a speed of $\omega_R$. In FIG. 2, also the rotating dq reference frame is depicted.

The electrical machine 12 may be a synchronous generator with a permanent magnet, but it could also be a synchronous generator with a field winding 40 or even an asynchronous generator. The three-phase winding systems 20a, 20b, which are also called armature windings, may be either in the stator 36 (as shown) or in the rotor 38. In the latter case, the field winding 40 or the permanent magnets is/are placed in the stator 36. Since the method as described herein can be employed in electrical motors as well, in general, the term "electrical machine" is used. In particular, in the following, the term "stator current" may refer to a winding current, which also may be provided by winding systems 20a, 20b, which are part of the rotor 38.

Figure 3:
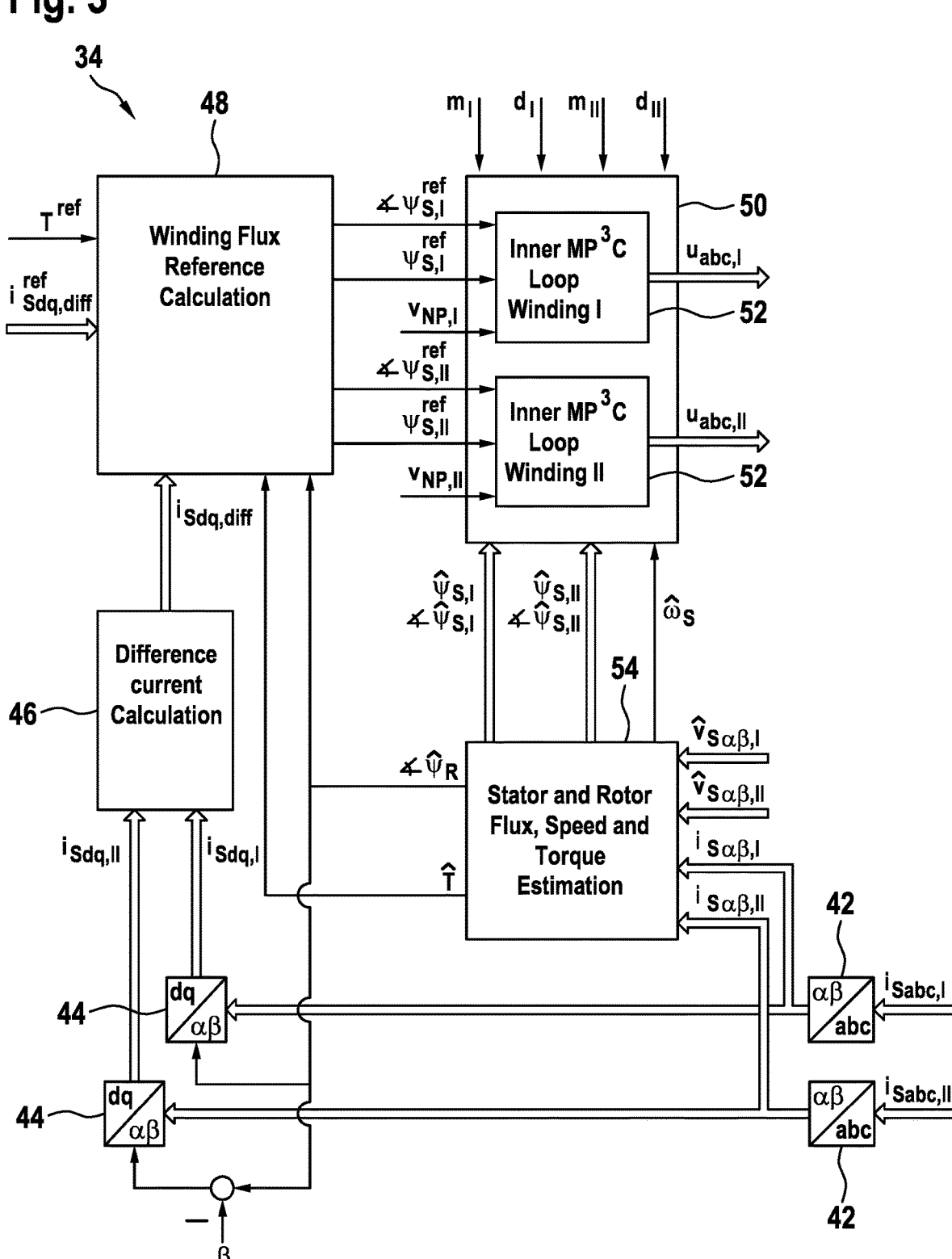
FIG. 3 schematically shows a controller according to an embodiment of the present disclosure and illustrates a method according to an embodiment of the disclosure.

FIG. 3 shows a block diagram, which illustrates the controller 34 and a method for controlling the electrical converter 14. FIG. 3 shows the control scheme for an electrical machine 12 with two winding systems 20a, 20b. The main objective is to control the torque of the electrical machine 12. In wind turbine applications, the reference torque $T^{ref}$ is provided by external control loops of the wind turbine operator. The objective is, by using the torque, to control and maximize the power produced by the wind turbine at a certain rotation speed and wind speed. In other applications, which require speed control, the reference torque $T^{ref}$ is provided by a speed controller.

A secondary control task, which is important for some modes of operation (e.g. heat run tests of a generator), is the control of the difference current $i_{Sdq,diff}$ between the two winding systems 20a, 20b. The difference current $i_{Sdq,diff}$ is calculated by subtracting the stator currents $i_{Sdq,I}$ and $i_{Sdq,II}$ in the dq reference frame in block 46. The measured stator currents $i_{Sabc,I}$ and $i_{Sabc,II}$ are transformed by blocks 42 into the stationary $\alpha\beta$ reference frame, i.e., $i_{S\alpha\beta,I}$ and $i_{S\alpha\beta,II}$, and by blocks 44 into the dq reference frame.

The reference value $$i^{ref}_{Sdq,diff}$$

of the difference current may be provided in the synchronously rotating dq reference frame, aligned with the rotor flux, and it consists of a d- and a q-axis component.

The reference torque $T^{ref}$ and the difference current reference $$i^{ref}_{Sdq,diff}$$

are sent to a block 48 where the flux reference calculation for each of the two stator winding systems 20a, 20b takes place. The winding flux reference calculation block 48 will be described in more detail with respect to FIG. 4.

The calculated winding flux references (with the amplitudes $$\psi^{ref}_{S,I} \text{ and } \psi^{ref}_{S,II}$$

and angles $$\sphericalangle\psi^{ref}_{S,I} \text{ and } \sphericalangle\psi^{ref}_{S,II})$$

are then forwarded to a model predictive control block 50 with two MP3C controllers and/or loops 52, one for each winding system 20a, 20b. In addition to the winding flux references, which are determined by the winding flux reference calculation block 48, the estimated stator fluxes (with the amplitudes $\hat{\psi}_{S,I}$ and $\hat{\psi}_{S,II}$ and angles $\sphericalangle\hat{\psi}_{S,I}$ and $\sphericalangle\hat{\psi}_{S,II}$) or more general the winding fluxes are sent to the model predictive control block 50 and the inner MP3C controllers 52, which then modify the switching commands $u_{abc,I}$ and $u_{abc,II}$ of each converter branch 14a, 14b to track the winding flux references. Furthermore, the measured or estimated neutral point potentials $v_{NP,I}$ and $v_{NP,II}$ of the DC-links 26 may be provided to the model predictive control block 50 and the inner MP3C controllers 52.

The estimator block 54 estimates the winding fluxes (with the amplitudes $\hat{\psi}_{S,I}$ and $\hat{\psi}_{S,II}$ and angles $\sphericalangle\hat{\psi}_{S,I}$ and $\sphericalangle\hat{\psi}_{S,II}$), the rotor flux with its angle $\sphericalangle\hat{\psi}_{R}$ and the torque $\hat{T}$ from the measured stator currents $i_{S\alpha\beta,I}$ and $i_{S\alpha\beta,II}$ and the measured stator voltages $v_{S\alpha\beta,I}$ and $v_{S\alpha\beta,II}$ or the reconstructed stator voltages $\hat{v}_{S\alpha\beta,I}$ and $\hat{v}_{S\alpha\beta,II}$ in the stationary $\alpha\beta$ reference frame. The three-phase stator voltages $v_{Sabc,I}$ and $v_{Sabc,II}$ are typically not measured but calculated from the switch positions and the measured dc-link voltage $v_{dc,I}$ and $v_{dc,II}$. Subsequently, they are transformed to the stationary $\alpha\beta$ reference frame.

If an encoder is available, the rotor position and speed are also provided to the flux observer. If no encoder is available, the rotor position $\theta_R$ and the speed $\omega_s$ are estimated by estimator block 54.

Figure 4:
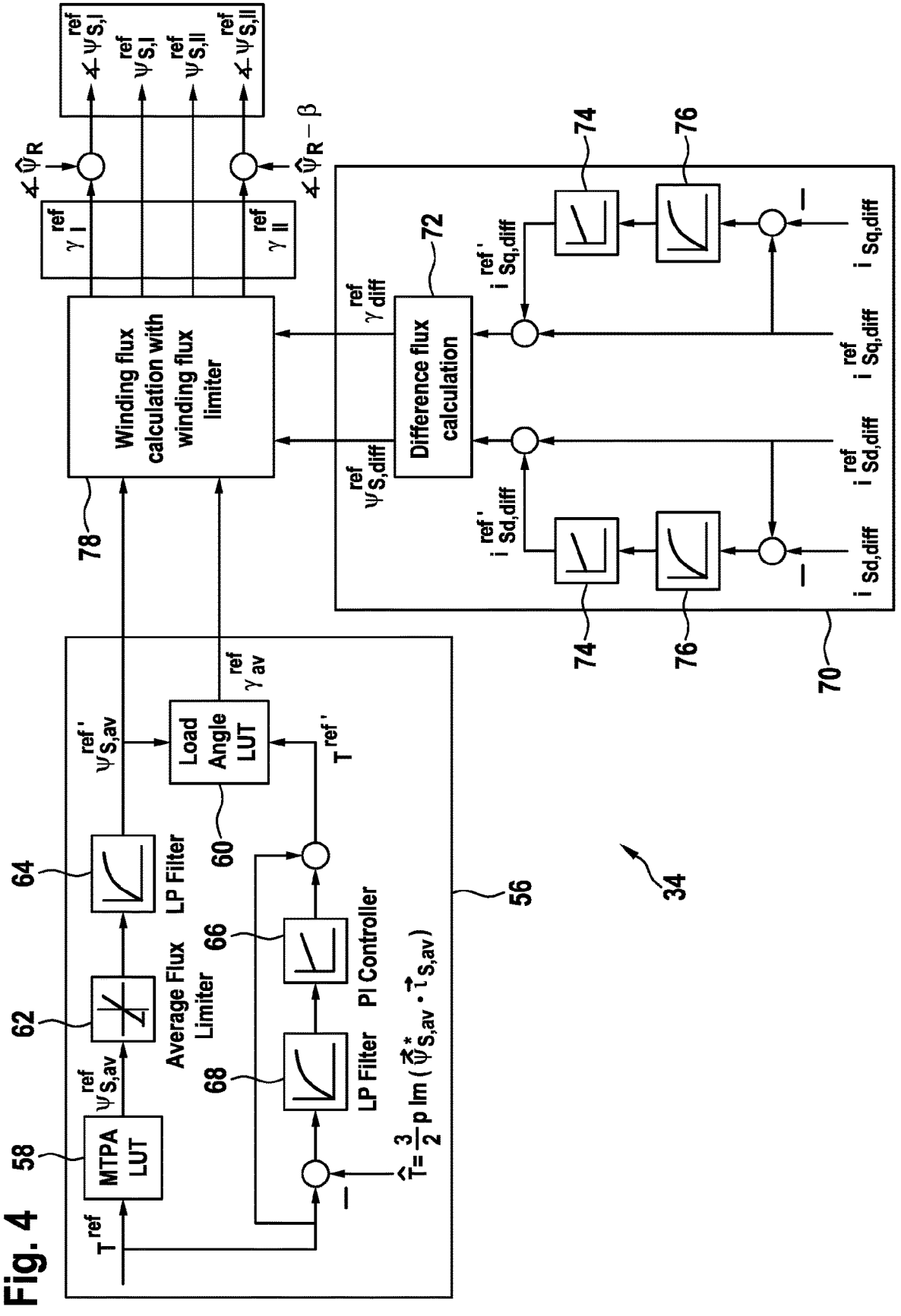
FIG. 4 schematically shows a part of the controller of FIG. 3 in more detail.

FIG. 4 shows the winding flux reference calculation block 48 in more detail. To reduce the number of symbols, only the subtraction sign "−" is used in the nodes. The addition sign "+" is implied where no subtraction sign appears. For the calculation of the winding flux references (with the amplitudes $$\psi^{ref}_{S,I} \text{ and } \psi^{ref}_{S,II}$$

and angles $$\sphericalangle\psi^{ref}_{S,I} \text{ and } \sphericalangle\psi^{ref}_{S,II})$$

for each winding system 20a, 20b, one must determine their amplitude and angle in a stationary $\alpha\beta$ reference frame.

Block 56 calculates an average flux reference from the reference torque $T^{ref}$ and the estimated torque $\hat{T}$, in particular it calculates the amplitude $$\psi^{ref}_{S,av}$$

and angle $$\gamma^{ref}_{av}$$

of the average flux reference with respect to the rotor flux angle. To control the torque $\hat{T}$ of the electrical machine 12, an average value of the fundamental components of the two fluxes in a rotating dq reference frame, aligned with the rotor flux, must have a specific amplitude $$\psi^{ref}_{S,av}$$

and angle $$\gamma^{ref}_{av}.$$

For some machine types, like asynchronous machines, the required amplitude and angle may be calculated analytically using a simple formula. For some other machine types, however, like synchronous permanent magnet machines, the required amplitude and angle is the solution of a non-linear optimization problem. In such a case, the optimal values of the amplitude and the angle can be pre-calculated and stored in look-up tables 58, 60.

The reference torque $T^{ref}$ is first provided to the look-up table 58, which defines the optimal average winding flux amplitude $$\psi^{ref}_{S,av}.$$

Typically, the winding flux amplitude $$\psi^{ref}_{S,av}$$

that minimizes the stator current for a given torque is considered as being optimal. This approach is known as MTPA (Maximum Torque Per Ampere). Alternatively, the look-up table 58 may define the stator flux or more general the winding flux that minimizes the rotor losses, the total generator losses, or the total losses of the drive (generator 12 and converter 14).

The subsequent limiter 62 ensures that specific limits of the average flux reference amplitude $$\psi_{S,av}^{ref}$$

are respected so that for example the maximum possible converter output voltage is not exceeded. The output of the limiter 62 is optionally low-pass filtered in the LP filter 64 and then forwarded to another look-up table 60, which defines the required average flux angle $$\gamma_{av}^{ref}$$

with respect to the rotor flux angle. The required average flux angle $$\gamma_{av}^{ref}$$

may be interpreted as a required load angle. The look-up table 60 calculates the required load angle for the given average flux amplitude $$\psi_{S,av}^{ref}$$

and a reference torque $T^{ref}$. Note that the reference torque $T^{ref}$ at the input of the look-up table 60 may be modified by a PI controller 66, which has as input the error between the reference torque $T^{ref}$ and the estimated torque $\hat{T}$. The PI controller 66 corrects torque error that may appear due to parameter value mismatches (differences between the actual and the considered values of the machine model parameters). This difference may also be low-pass filtered by the LP filter 68. The estimated torque $\hat{T}$ is calculated from the cross product of the estimated average flux and the average current:

$$\hat{T} = \frac{3}{2}p\mathrm{Im}\left(\vec{\hat{\psi}}_{S,av}^{*} \cdot \vec{i}_{S,av}\right), \tag{1}$$

where the asterisk indicates the conjugate complex value of the estimated average flux. The arrow indicates the space vector.

The average flux and current in the stationary reference frame are computed as follows:

$$\begin{bmatrix} \hat{\psi}_{S\alpha,av} \\ \hat{\psi}_{S\beta,av} \end{bmatrix} = \frac{1}{2}\left(\begin{bmatrix} \hat{\psi}_{S\alpha,I} \\ \hat{\psi}_{S\beta,II} \end{bmatrix} + R(\beta)\begin{bmatrix} \hat{\psi}_{S\alpha,II} \\ \hat{\psi}_{S\beta,II} \end{bmatrix}\right), \tag{2}$$

-continued $$\begin{bmatrix} i_{S\alpha,av} \\ i_{S\beta,av} \end{bmatrix} = \frac{1}{2}\left(K\begin{bmatrix} i_{Sa,I} \\ i_{Sb,I} \\ i_{Sc,I} \end{bmatrix} + R(\beta)K\begin{bmatrix} i_{Sa,II} \\ i_{Sb,II} \\ i_{Sc,II} \end{bmatrix}\right), \tag{3}$$

where $$R(\beta) = \begin{bmatrix} \cos(\beta) & -\sin(\beta) \\ \sin(\beta) & \cos(\beta) \end{bmatrix} \tag{4}$$

$$K = \frac{1}{2}\begin{bmatrix} 1 & -1/2 & -1/2 \\ 0 & \sqrt{3}/2 & -\sqrt{3}/2 \end{bmatrix} \tag{5}$$

The components of the estimated winding flux $\hat{\psi}_{S\alpha\beta,I}$ and $\hat{\psi}_{S\alpha\beta,II}$ that appear on the right side of (2) are calculated by two separate winding flux estimators, one for each winding system 20a, 20b. These winding flux estimators are part of block 54 (FIG. 3). The estimated winding flux is also necessary for the MP3C controllers 52, which are described in more detail with respect to FIG. 5. The winding currents $i_{Sabc,I}$ and $i_{Sabc,II}$ that appear on the right side of (3) are directly measured.

The control of the difference current is achieved via the control of a difference flux reference with the amplitude $$\psi_{S,diff}^{ref}$$

and angle $$\gamma_{diff}^{ref},$$

which is determined in block 70. From the difference current, the difference flux reference $$\psi_{Sdq,diff}^{ref}$$

in the synchronously rotating dq reference frame is computed in block 72 using the estimated stator winding inductances:

$$\begin{bmatrix} \psi_{Sd,diff}^{ref} \\ \psi_{Sq,diff}^{ref} \end{bmatrix} = \begin{bmatrix} \hat{L}_{Sd} - \hat{M}_{Sd} & 0 \\ 0 & \hat{L}_{Sq} - \hat{M}_{Sq} \end{bmatrix}\begin{bmatrix} i_{Sd,diff}^{ref} \\ i_{Sq,diff}^{ref} \end{bmatrix} \tag{6}$$

$$\psi_{S,diff}^{ref} = \sqrt{\left(\psi_{Sd,diff}^{ref}\right)^2 + \left(\psi_{Sq,diff}^{ref}\right)^2} \tag{7}$$

$$\gamma_{diff}^{ref} = \arctan\left(\psi_{Sq,diff}^{ref}/\psi_{Sd,diff}^{ref}\right) \tag{8}$$

The difference current $i_{Sdq,diff}$ in the rotating dq reference frame is calculated from the measured currents of each winding in the rotating frame as follows:

$$i_{Sd,diff} = i_{Sd,I} - i_{Sd,II} \tag{9}$$

$$i_{Sq,diff} = i_{Sq,I} - i_{Sq,II} \tag{10}$$

Note that the multiplication in (6) is not applied directly to the difference current reference components $$i_{Sd,diff}^{ref} \text{ and } i_{Sq,diff}^{ref}.$$

An additional term coming from the output of two PI controllers 74 is added to them to obtain the filtered components $$i_{Sd,diff}^{ref'} \text{ and } i_{Sq,diff}^{ref'},$$

which are input in block 72. The input to these PI controllers 74 is the difference current error in the d- and in the q-axis, low-pass filtered by LP filters 76. The tasks of the blocks 74, 76 is to correct difference current errors that may appear due to incorrect difference flux calculations because of parameter value mismatches.

In the winding flux calculation block 78, the winding flux references (with the amplitudes $$\psi_{S,I}^{ref} \text{ and } \psi_{S,II}^{ref}$$

and load angles $$\gamma_I^{ref} \text{ and } \gamma_{II}^{ref})$$

are calculated from the average flux reference (with the amplitude $$\psi_{S,av}^{ref'}$$

and load angle $$\gamma_{av}^{ref})$$

and the difference flux reference (with the amplitude $$\psi_{S,diff}^{ref}$$

and angle $$\gamma_{diff}^{ref}):$$

$$\begin{bmatrix} \psi_{Sd,I}^{ref} \\ \psi_{Sq,I}^{ref} \end{bmatrix} = \psi_{S,av}^{ref'} \begin{bmatrix} \cos(\measuredangle \gamma_{av}^{ref}) \\ \sin(\measuredangle \gamma_{av}^{ref}) \end{bmatrix} + \frac{1}{2} \psi_{S,diff}^{ref} \begin{bmatrix} \cos(\measuredangle \gamma_{diff}^{ref}) \\ \sin(\measuredangle \gamma_{diff}^{ref}) \end{bmatrix} \quad (11a)$$

$$\begin{bmatrix} \psi_{Sd,II}^{ref} \\ \psi_{Sq,II}^{ref} \end{bmatrix} = \psi_{S,av}^{ref'} \begin{bmatrix} \cos(\measuredangle \gamma_{av}^{ref}) \\ \sin(\measuredangle \gamma_{av}^{ref}) \end{bmatrix} - \frac{1}{2} \psi_{S,diff}^{ref} \begin{bmatrix} \cos(\measuredangle \gamma_{diff}^{ref}) \\ \sin(\measuredangle \gamma_{diff}^{ref}) \end{bmatrix} \quad (11b)$$

From the d- and q-axis components, the flux amplitude and angle for each winding system can be computed:

$$\psi_{S,I}^{ref} = \sqrt{\left(\psi_{Sd,I}^{ref}\right)^2 + \left(\psi_{Sq,I}^{ref}\right)^2} \quad (12a)$$

$$\psi_{S,II}^{ref} = \sqrt{\left(\psi_{Sd,II}^{ref}\right)^2 + \left(\psi_{Sq,II}^{ref}\right)^2} \quad (12b)$$

$$\gamma_I^{ref} = \arctan(\psi_{Sq,I}^{ref}/\psi_{Sd,I}^{ref}) \quad (13a)$$

$$\gamma_{II}^{ref} = \arctan(\psi_{Sq,II}^{ref}/\psi_{Sd,II}^{ref}) \quad (13b)$$

The calculated amplitude $$\psi_{S,I}^{ref} \text{ and } \psi_{S,II}^{ref}$$

may exceed a specified limit. In this case, either the average flux or the difference flux must be reduced. Either the average flux (the torque) or the difference flux (the difference current) can be prioritized. Typically, it is the former and therefore the difference flux amplitude needs to be reduced in such a way that the amplitudes of the winding fluxes do not exceed the specified limits. The required reduction factor k is determined from the solution of a quadratic equation:

$$\left(\psi_{Sd,av}^{ref} + k\,\psi_{Sd,diff}^{ref}\right)^2 + \left(\psi_{Sq,av}^{ref} + k\,\psi_{Sq,diff}^{ref}\right)^2 - \left(\psi_{S,max}^{ref}\right)^2 = 0 \quad (14)$$

In the above consideration, the angle of the difference flux reference $$\psi_{Sdq,diff}^{ref}$$

remains unchanged and only its amplitude changes. In equation (14), the amplitude of the difference flux reference $$\psi_{S,diff}^{ref}$$

is multiplied with the factor k, with 0<k<1, to limit the winding flux reference amplitudes $$\psi_{S,I}^{ref} \text{ and } \psi_{S,II}^{ref}.$$

If desired, one can also prioritize the d- or the q-axis component of the difference flux. The component with the least priority can be again determined from the solution of a quadratic equation.

In the end, the winding flux reference angles $$\measuredangle \psi_{S,I}^{ref} \text{ and } \measuredangle \psi_{S,II}^{ref}$$

in the stationary αβ reference frame are calculated. To this end, the estimated (or measured if an encoder is available) rotor flux angle $\measuredangle \hat{\psi}_R$ and the rotor flux angle minus the electrical geometrical displacement angle of winding no. 2 $\measuredangle \hat{\psi}_R - \beta$ are added to the previously calculated load angles of winding system no. 1 and no. 2 respectively.

As shown in FIG. 3, the winding flux reference (with the amplitudes $$\psi_{S,I}^{ref} \text{ and } \psi_{S,II}^{ref}$$

and angles $$\sphericalangle \psi_{S,I}^{ref} \text{ and } \sphericalangle \psi_{S,II}^{ref})$$

and the estimated winding flux (with the amplitudes $\sphericalangle \hat{\psi}_{S,I}$ and $\sphericalangle \hat{\psi}_{S,II}$ and angles $\sphericalangle \hat{\psi}_{S,I}$ and $\sphericalangle \hat{\psi}_{S,II}$) for each winding system 20a, 20b are sent to the MP3C controllers 52, which both may operate as described in EP 2 469 69 2A1 and U.S. Pat. No. 8,766,570 B2.

Figure 5:
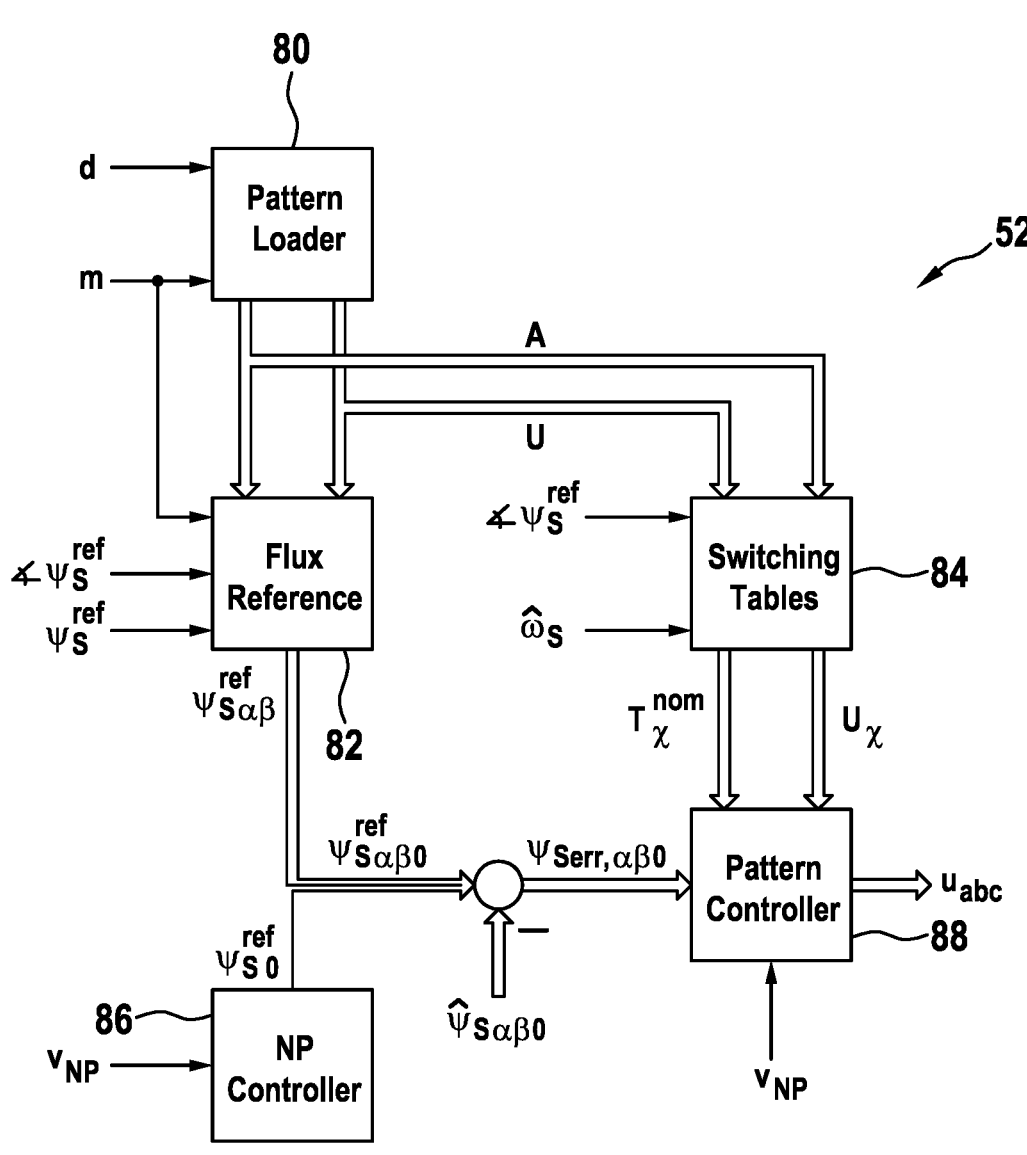
FIG. 5 schematically shows a further part of the controller of FIG. 3 in more detail.

Such an MP3C controller 52 is shown in FIG. 5. From the flux reference amplitude $$\psi_{S,I}^{ref} \text{ and } \psi_{S,II}^{ref},$$

the estimated or measured stator angular frequency $\hat{\omega}_S$, and the measured dc-link voltage $v_{dc,I}$ and $v_{dc,II}$, the appropriate modulation index m for the respective winding system 20a, 20b is determined and together with the pulse number d, the respective OPP is loaded for each of the two converters based on the following equations:

$$m_I = \frac{2}{v_{dc,I}} \hat{\omega}_S \psi_{S,I}^{ref}. \tag{15a}$$

$$m_{II} = \frac{2}{v_{dc,II}} \hat{\omega}_S \psi_{S,II}^{ref}. \tag{15b}$$

A low-pass filtered dc-link voltage $v_{dc,I}$ and $v_{dc,II}$ may be used in the above equations. Note that for a synchronous machine 12, the measured or estimated rotor speed can be used instead of the estimated stator frequency $\hat{\omega}_S$. For the selection of the appropriate OPP, the pulse number d is also required, which is selected in such a way, so that the converter switching frequency does not exceed its maximum value.

Dependent on the modulation index m and the pulse number d, the pattern loader 80 provides a vector of primary switching angles $A=[\alpha_1 \ \alpha_2 \ \ldots \ \alpha_d]^T$ and a corresponding vector of single-phase switch positions $U=[u_1 \ u_2 \ \ldots \ u_d]^T$. Typically, a pulse pattern with quarter- and half-wave symmetry is assumed, and the pulse number d is the number of switching angles within one quarter of the fundamental period of the three-level switching waveform. The three-phase pulse pattern that corresponds to the above vectors A and U can be easily constructed by using the quarter- and half-wave as well as the three-phase symmetry.

A reference flux trajectory can then be calculated in block 82 by using the state-space model of the electrical machine 12. In the general case of a salient synchronous machine, the state-space model is given by $$\frac{d}{dt} \begin{bmatrix} \psi_{S\alpha,I} \\ \psi_{S\beta,I} \\ \psi_{S\alpha,II} \\ \psi_{S\beta,II} \end{bmatrix} = F \begin{bmatrix} \psi_{S\alpha,I} \\ \psi_{S\beta,I} \\ \psi_{S\alpha,II} \\ \psi_{S\beta,II} \end{bmatrix} + \begin{bmatrix} v_{S\alpha,I} \\ v_{S\beta,I} \\ v_{S\alpha,II} \\ v_{S\beta,II} \end{bmatrix} + T \begin{bmatrix} \psi_{R\alpha} \\ \psi_{R\beta} \end{bmatrix}. \tag{16}$$

The system matrix is defined as $$F = -\frac{1}{2} R_S \begin{bmatrix} \left[ (L+M)^{-1} + (L-M)^{-1} \right] & \left[ (L+M)^{-1} - (L-M)^{-1} \right] \\ \left[ (L+M)^{-1} - (L-M)^{-1} \right] & \left[ (L+M)^{-1} + (L-M)^{-1} \right] \end{bmatrix}, \tag{17}$$

where $$(L \pm M)^{-1} = \frac{1}{(L_{Sav} \pm M_{Sav})^2 - (L_{Sdiff} \pm M_{Sdiff})^2}$$

$$\begin{bmatrix} L_{Sav} \pm M_{Sav} - (L_{Sdiff} \pm M_{Sdiff}) \cdot \cos(2\theta_R) & -(L_{Sdiff} \pm M_{Sdiff}) \cdot \sin(2\theta_R) \\ -(L_{Sdiff} \pm M_{Sdiff}) \cdot \sin(2\theta_R) & L_{Sav} \pm M_{Sav} + (L_{Sdiff} \pm M_{Sdiff}) \cdot \cos(2\theta_R) \end{bmatrix} \tag{19}$$

with the components $$L_{Sav} = (L_{Sd} + L_{Sq})/2 \tag{20}$$

$$L_{Sdiff} = (L_{Sd} - L_{Sq})/2 \tag{21}$$

$$M_{Sav} = (M_{Sd} + M_{Sq})/2 \tag{22}$$

$$M_{Sdiff} = (M_{Sd} - M_{Sq})/2 \tag{23}$$

The input matrix of (16) is defined as $$T = \frac{1}{2} R_S (L+M)^{-1} \begin{bmatrix} I_2 \\ I_2 \end{bmatrix} \tag{24}$$

$$I_2 = \begin{bmatrix} 1 & 0 \\ 0 & 1 \end{bmatrix}. \tag{25}$$

For a non-salient machine the following statements hold:

$$L_{Sd} = L_{Sq} = L_{Sav} \tag{26}$$

$$L_{Sdiff} = 0 \tag{27}$$

$$M_{Sd} = M_{Sq} = M_{Sav} \tag{28}$$

$$M_{Sdiff} = 0 \tag{29}$$

Furthermore, it is evident from (19) that for a salient machine, the state-space model parameters and specifically the inductances depend on the rotor angle. This means that the reference trajectory for a set of OPPs also depends on the rotor angle and we have an LTV (Linear Time Varying) state space-model.

It may be, such as in medium-voltage electrical machines 12, that the stator resistance $R_S$ has a very low value. Because of that, the first and the last term of (16) can be omitted and the state-space model can be approximated by $$\frac{d}{dt}\begin{bmatrix}\psi_{S\alpha,I}\\\psi_{S\beta,I}\\\psi_{S\alpha,II}\\\psi_{S\beta,II}\end{bmatrix}=\begin{bmatrix}v_{S\alpha,I}\\v_{S\beta,I}\\v_{S\alpha,II}\\v_{S\beta,II}\end{bmatrix}. \tag{30}$$

The above equation means that the flux of each winding system 20a, 20b may be simply calculated from the integral of the respective winding voltage regardless of whether the machine has saliency or not. The winding voltage that corresponds to the selected OPP is calculated by multiplying the OPP switch positions with the half dc-link voltage. Typically, only the switch positions are used, since the flux reference is calculated to be independent of the drive parameters, most notably the dc-link voltage. The integral of the switch positions (in the $\alpha\beta$ reference frame) is divided by the modulation index and multiplied with the flux reference amplitude. Also considering the flux reference angle, one can compute the flux reference from the optimal trajectory.

In block 84, switching tables are constructed that hold in each phase the upcoming switching transitions. More specifically, the vector of single-phase switch positions $$U_x = [\,u_{x1}\quad u_{x1}\quad \dots\quad u_{xn_x}\,]^T \tag{31}$$

with $n_x$ entries is constructed for the phase $x\in\{a, b, c\}$. The nominal switching angles relative to the reference angle $$\Delta\psi_S^{ref}$$

are translated into nominal switching instants (relative to the current time instant) by dividing them by the estimated angular stator frequency $\hat{\omega}_S$. This leads to the corresponding vector of nominal switching instants $$T_x^{nom} = [\,t_{x1}^{nom}\quad t_{x2}^{nom}\quad \dots\quad t_{xn_x}^{nom}\,]^T. \tag{32}$$

The pair $U_x$ and $$T_x^{nom}$$

forms the switching table for phase x. Apart from the OPP switching transitions, additional switching transitions can be considered, which are inserted into the switching table, in order to achieve a faster torque response.

The next step is to calculate the instantaneous flux error, which is the difference between the winding flux reference $$\psi_{S\alpha\beta}^{ref}$$

and its estimate $\hat{\psi}_{S\alpha\beta}$:

$$\psi_{Serr,\alpha\beta} = \psi_{S\alpha\beta}^{ref} - \hat{\psi}_{S\alpha\beta}. \tag{33}$$

Additionally, a common-mode flux error component $\omega_{Serr,0}$ can be added to control the neutral point potential, as described in EP 15 177 656 A1. To this end, the measured neutral point potential $v_{dc,I}$ and $v_{dc,II}$ for the respective DC-link 26 is input into the neutral point controller 86, which determines a 0-component flux $$\psi_{S0}^{ref}$$

for the winding flux reference trajectory.

The pattern controller 88 manipulates the switching instants of the OPP with the aim to reduce the winding flux error over a certain time interval (the prediction horizon). In doing so, the winding flux vector is controlled along its reference trajectory and closed-loop control of the winding flux error is achieved. The result is a three-phase switching command $u_{abc}=[u_a\ u_b\ u_c]^T$ or, more generally, a sequence thereof. The obtained switching commands for the first sampling interval are applied to the electrical converter 14. At the next sampling instant, the switching sequence of switching commands is recomputed, in accordance with the receding horizon policy.

While the present disclosure has been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art and practicing the present disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for controlling an electrical converter, the electrical converter comprising at least two converter branches connected in parallel to at least two winding systems of an electrical machine, the method comprising:

determining an average flux reference from a reference torque and an estimated torque, which is determined from measured currents and measured voltages and/or reconstructed voltages in the winding systems;

determining at least one difference flux reference from at least one difference current reference;

determining a winding flux reference for each winding system from the average flux reference and the at least one difference flux reference by adding and/or subtracting the at least one difference flux reference to the average flux reference;

determining switching commands for each converter branch from the winding flux reference and an estimated winding flux for the winding system, which is connected to the respective converter branch, wherein the estimated winding flux is determined from the measured current and the measured voltages and/or the reconstructed voltages in the winding system, and wherein the winding flux reference and the estimated winding flux are provided to a dedicated model predictive controller for the respective converter branch, which determines the switching commands; and applying the switching commands to each converter branch.

2. The method of claim 1, wherein:

the switching commands are determined from optimized pulse patterns, which are loaded from a look-up table, and/or the switching commands are determined online during operation of the electrical converter, and/or switching instants of the switching commands are moved to minimize a flux error, which is a difference between an optimal winding flux trajectory, determined from the winding flux reference and the estimated winding flux.

3. The method of claim 1, wherein the switching commands for each converter branch are determined independently from the switching commands of at least one other converter branch.

4. The method of claim 1, wherein:

the average flux reference and the at least one difference flux reference are determined in a rotating reference frame, and/or the winding flux references are determined in the rotating reference frame and transformed into a stationary reference frames, and/or an angle of the winding flux reference is calculated in the stationary reference frame.

5. The method of claim 1, wherein;

the at least one difference flux reference is determined from the at least one difference current reference by multiplication with an estimated stator winding inductance for each winding system.

6. The method of claim 1, further comprising:

determining at least one difference current from measured currents in the at least two winding systems and determining a difference current error by subtracting the difference current from the difference current reference;

low-pass filtering the difference current error and/or PI controlling the difference current error; and adding the low-pass filtered and/or PI controlled difference current error to the difference current reference.

7. The method of claim 1, wherein:

an amplitude of the average flux reference is determined from a look-up table based on the reference torque, and/or the amplitude of the average flux reference is low-pass filtered.

8. The method of claim 1, wherein:

an amplitude of the average flux reference is limited within predefined limits.

9. The method of claim 1, wherein:

an angle of the average flux reference is determined from a look-up table based on an amplitude of the average flux reference and the reference torque, and/or a torque error, which is a difference between the reference torque and the estimated torque, is low-pass filtered and/or PI controlled and added to the reference torque.

10. The method of claim 1, further comprising:

when an amplitude of the winding flux reference of a winding system exceeds a limit, limiting an amplitude of the average flux reference and/or an amplitude of the difference flux reference amplitude, such that an amplitude of a recalculated winding flux reference stays below the limit.

11. The method of claim 1, wherein:

each converter branch is configured converting three-phase electrical quantities with a fundamental voltage, current and frequency into three-phase electrical quantities with another fundamental voltage, current and frequency, each converter branch comprises a rectifier, a DC-link and an inverter, and/or opposite to the electrical machine, each converter branch is connected to a secondary winding of a transformer.

12. A computer program for controlling an electrical converter, the electrical converter comprising at least two converter branches connected in parallel to at least two winding systems of an electerical machine, which, when executed by a processor, is configured to;

determine an average flux reference from a reference torque and an estimated torque, which is determined from measured currents and measured voltages and/or reconstructed voltages in the winding systems;

determine at least one difference flux reference from at least one difference current reference;

determine a winding flux reference for each winding system from the average flux reference and the at least one difference flux reference by adding and/or subtracting the at least one difference flux reference to the average flux reference;

determine switching commands for each converter branch from the winding flux reference and an estimated winding flux for the winding system, which is connected to the respective converter branch, wherein the estimated winding flux is determined from the measured current and the measured voltages and/or the reconstructed voltages in the winding system, and wherein the winding flux reference and the estimated winding flux are provided to a dedicated model predictive controller for the respective converter branch, which determines the switching commands; and apply the switching commands to each converter branch.

13. A controller for controlling an electrical converter configured to:

determine an average flux reference from a reference torque and an estimated torque, which is determined from measured currents and measured voltages and/or reconstructed voltages in winding systems;

determine at least one difference flux reference from at least one difference current reference;

determine a winding flux reference for each winding system from the average flux reference and the at least one difference flux reference by adding and/or subtracting the at least one difference flux reference to the average flux reference;

determine switching commands for each converter branch from the winding flux reference and an estimated winding flux for the winding system, which is connected to the respective converter branch, wherein the estimated winding flux is determined from the measured current and the measured voltages and/or the reconstructed voltages in the winding system, and wherein the winding flux reference and the estimated winding flux are provided to a dedicated model predictive controller for the respective converter branch, which determines the switching commands; and apply the switching commands to each converter branch.

14. An electrical converter, comprising:

the controller according to claim 13; and at least two converter branches connected in parallel to at least two winding systems of an electrical machine.

* * * * *